Patented Feb. 16, 1954

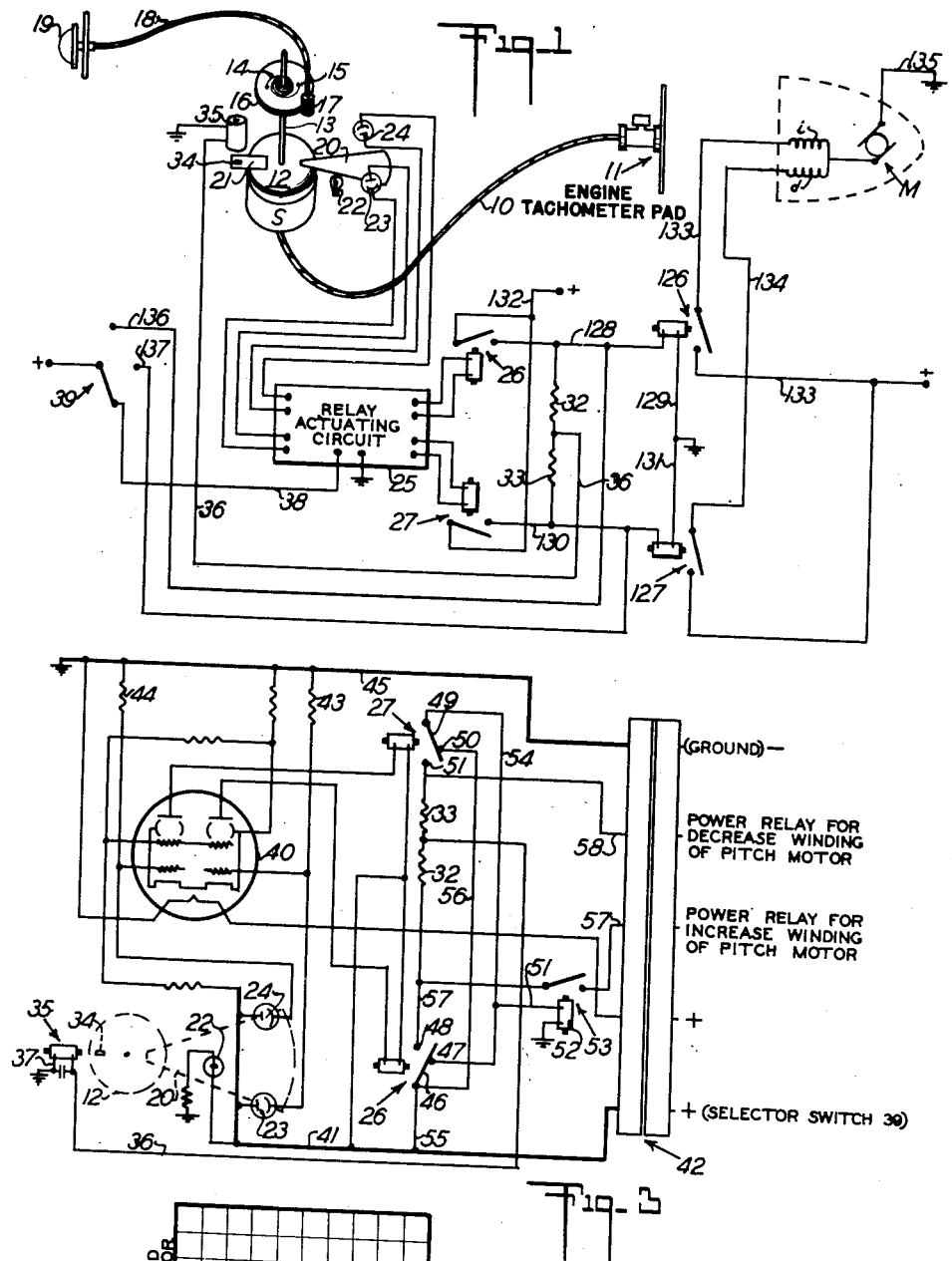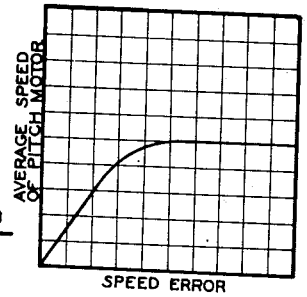

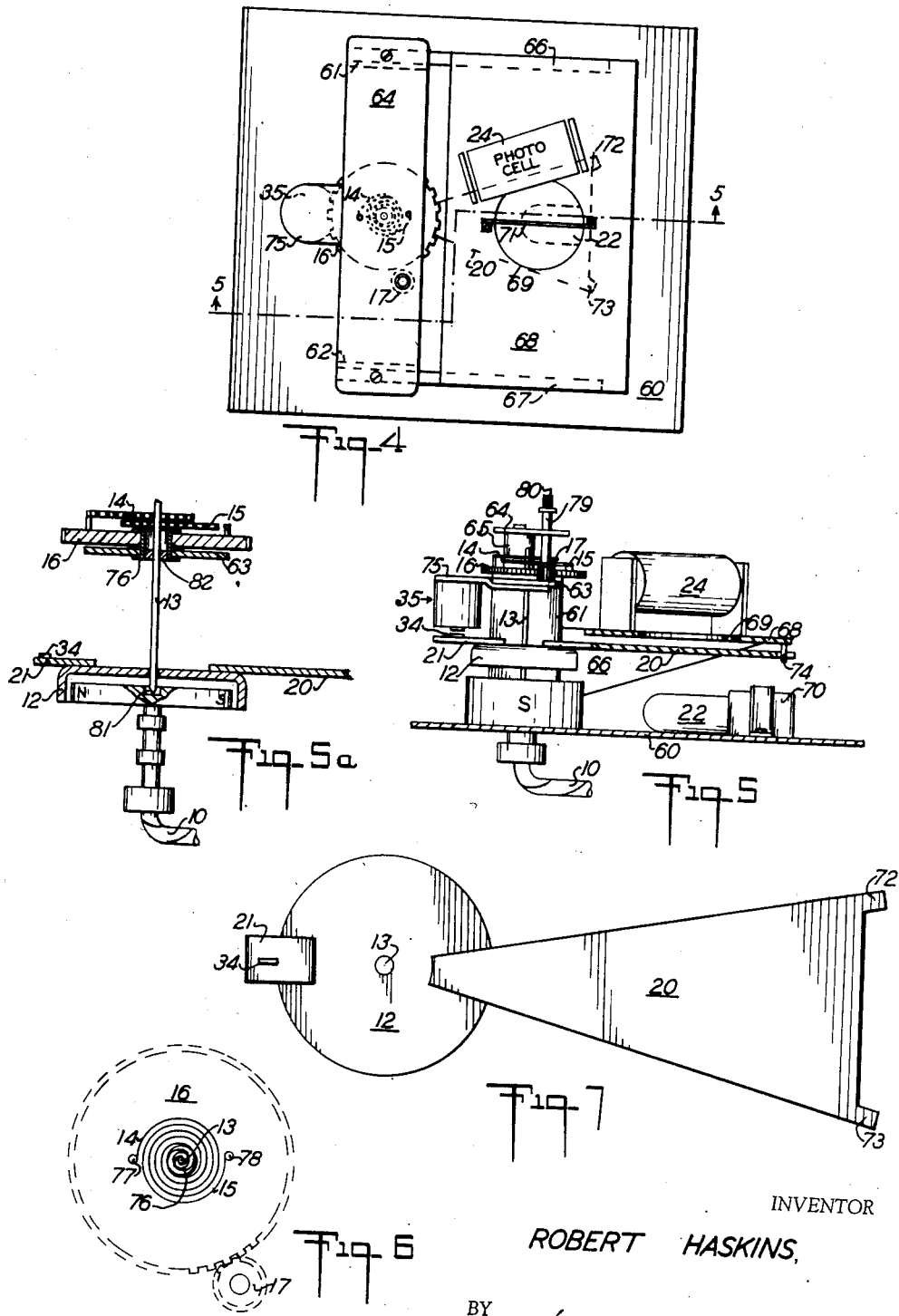

2,669,310

UNITED STATES PATENT OFFICE 2,669,310

AUTOMATIC CONSTANT SPEED GOVERNOR FOR ENGINES DRIVING VARIABLE PITCH PROPELLERS

Robert Haskins, Richmond, Va., assignor to Flight Research, Inc., a corporation of Virginia Application May 17, 1950, Serial No. 162,475

11 Claims. (Cl. 170—160.2)

This invention relates to automatic control systems, and particularly to automatic constant speed governors for aircraft engines.

It has long been known to obtain substantially constant speed control of an aircraft engine by varying the pitch of the propeller driven by the engine in response to engine speed changes, so that the resulting change in pitch causes the speed change to be corrected. Such devices have included those of the hydraulic type, which have been extremely costly. Where automatic constant speed governors involving speed responsive control devices employed to control an electric pitch changing motor have been suggested, the results have usually been unsatisfactory because of the delicate and relatively undependable nature of the electrical control systems employed.

In contrast to such prior devices, the present invention provides an automatic aircraft engine speed control system of the type wherein speed changes of the aircraft engine are translated into corrective adjustments of the pitch of the aircraft propeller by means of an eddy current type speed sensor driven from the aircraft engine, a photoelectric system activated in response to actions of the speed sensor, and a pair of control relays selectively actuated by the photoelectric system in accordance with the actions of the speed sensor, the control relays operating to energize selectively the increase and decrease windings of a conventional electrical pitch changing motor carried by the propeller.

The invention further provides a novel arrangement for obtaining, with a simple speed responsive photoelectric control system, controlling actions which are substantially proportional to the true speed change or error, so as to avoid any material tendency of the control system to "hunt."

In a preferred form, the invention includes an eddy current type speed sensor driven from the aircraft engine and serving to translate engine speed changes into torque applied to a rotatable drag cup, a light vane moved by the drag cup, a manually adjustable spiral spring biasing device arranged to apply a positioning or restraining force to the drag cup, a light source, a pair of photoelectric cells arranged to be activated by the light source, the light vane being positioned to normally prevent the passage of light from the source to either photoelectric cell but being laterally displaced as a result of rotation of the drag cup to allow selective activation of the photoelectric cells, and electrical means for selectively actuating, in response to action of the photoelectric cells the respective power relays controlling the increase and decrease windings of the electrical pitch changing motor. Thus, the position of the light vane, and therefore the controlling operation of the device as a whole, at any one instant depends upon the resultant effect upon the drag cup of the speed sensor and the manually adjusted biasing device, so that a major feature of the invention is the provision in such a device of means by which the engine speed maintained by the device can be selected manually.

In a preferred form, the invention also provides means for returning the light vane to its normal position whenever one of the photoelectric cells is activated, the returning means being operable only while a cell is energized and having a returning power sufficient to center the light vane, overcoming the action of the speed sensor, only if the vane is not displaced more than a predetermined amount. If the speed error is large, then the returning means, though actuated, is ineffective. Thus, the controlling action of the device is continuous for relatively large speed errors, but is cyclically interrupted—to give proportional control—whenever the speed error is relatively small.

Another important feature of the invention is the provision of means whereby short circuits or other electrical failures of the device result in substantially instantaneous termination of the control action, so that the pitch of the propeller hereafter remains as it was the moment the failure occurred.

In order that these and other features of the invention may be readily understood, reference is had to the accompanying drawings, which form a part of this specification, and wherein:

Figure 1 is a diagrammatic illustration of one embodiment of the invention;

Figure 2 is a diagram illustrating the operation of an interrupter magnet employed in the invention for obtaining substantially proportional control action;

Figure 3 is a schematic diagram of a preferred circuit forming a part of the invention and operating to obtain actuation of a pair of motor control relays in response to selective activation of a pair of photoelectric cells;

Figure 4 is a partial plan view of the mechanical organization of the speed sensing mechanism and speed selecting means employed in the invention;

Figure 5 is a sectional view taken on the line 5—5, Fig. 4;

Figure 5ª is a vertical sectional view of a preferred eddy current speed sensor and drag cup mechanism employed in the invention;

Figure 6 is a fragmentary plan view of a portion of the speed selecting means of the invention, and Figure 7 is a plan view of the drag cup and associated elements employed in the invention to translate detected engine speed error into selective operation of a photoelectric control system.

Fig. 1 illustrates diagrammatically the general combination of elements employed in a preferred form of the invention. Here, it will be seen that an eddy current type speed sensor S is driven by a flexible shaft 10 rotated from the tachometer pad 11 of the aircraft engine. The speed sensor S serves to angularly position a drag cup 12 in response to engine speed change, in a manner well known in the prior art. The drag cup 12 is supported by a rotatable shaft 13 biased against rotation by a pair of spiral hair springs 14 and 15, as hereinafter described in detail. The restraining springs 14 and 15 are connected at their centers to diametrically opposed points on the shaft 13, and at their outer ends to a speed range adjusting gear 16. A pinion 17, rotatable through a flexible shaft 18 manually turned by knob 19 on the aircraft instrument panel, meshes with the gear 16. Thus, the angular position of the drag cup 12 is determined by the resultant of the force applied thereon by the speed sensor and the restraining force applied to the shaft by the hair springs.

The drag cup 12 carries an opaque light vane 20 and, diametrically opposed thereto, a counterbalance 21. The light vane 20 is positioned between a light source 22, such as an incandescent lamp energized from any suitable current source, and a pair of spaced photoelectric cells 23 and 24, in such a manner that, when the drag cup 12 is in a predetermined "centered" or "on speed" position, no light from the source is allowed to fall on either photoelectric cell, while material rotation of the drag cup in either direction will expose one or the other of the two tubes to light from the light source. It will be clear from the foregoing that the "centered" position of the drag cup is determined by the position of the range adjusting knob 19, and that activation of either of the two photocells results only from a material engine speed change as translated by the speed sensor S into lateral displacement of the light vane 20 to the right or left, depending upon the sense of the speed change.

The photoelectric cells 23 and 24 control a suitable relay actuating circuit, here indicated at 25, to actuate selectively a pair of control relays 26 and 27. Through control circuits to be described, the relay 26 controls a power relay 126 which serves when deenergized to interrupt the supply circuit for the increase winding $i$ of the propeller pitch changing motor indicated schematically at M, and the relay 27 controls a second power relay 127 arranged when deenergized to interrupt the supply circuit for the decrease winding $d$ of the pitch changing motor. The winding $i$ is supplied from a suitable power source through the conductor 133, while the winding $d$ is supplied from the power source through conductor 134. The actuating winding of power relay 126 is supplied from a suitable power source by conductors 132 and 128, the circuit being completed to ground via conductor 129, while the actuating winding of the power relay 127 is similarly supplied from the same source by a circuit comprising conductors 132, 130 and 131.

Bridged across the conductors 128 and 130 is the series combination of two resistances 32 and 33, and the junction between the two resistances is connected to conductor 36 leading to the winding of an electromagnet 35 and thence to ground. Carried by the counterbalance 21 is a magnetic element 34, such as a soft iron slug, and the electromagnet 35 is positioned on a vertical line with the magnetic element 34 when the drag cup 12 is in "centered" position. Whenever one of the control relays 26 and 27 is energized, current will flow through the corresponding one of the resistances 32 and 33, conductor 36, the winding of electromagnet 35, and to the grounded side of the power relay supply. Thus, energization of either of the relays 26 and 27 results in simultaneous energization of the electromagnet 35. The electromagnet 35 will then attract the magnetic element 34.

The relay actuating circuit 25 is supplied from a suitable current source, which may be the same source employed to energize the power relay windings, by a circuit comprising conductor 38 and ground. A manual switch 39, located on the aircraft instrument panel, is provided to make and break the supply to the circuit 25, as shown. The manual switch 39 is preferably a 3-position switch, the remaining two contacts thereof being employed for selective manual control of the power relays 126 and 127 via the conductors 136 and 137, respectively, as shown. Thus, the switch 39 can be used either to activate the relay actuating circuit 25, or to selectively energize either power relay to the exclusion of the automatic control.

Operation of the device illustrated in Fig. 1 is as follows: Assume that the springs 14 and 15 apply a given biasing force to the shaft 13, and that the aircraft engine R. P. M. driving the speed sensor S is insufficient to equalize the biasing force of the spring. Assume that relay actuating circuit 25 is so designed that activation of photoelectric cell 24 actuates the relay circuit to energize relay 27 and thus energize the decrease winding of the propeller pitch adjusting motor. The effect of the speed sensor S upon the drag cup 12 being insufficient to equalize the biasing force of the springs 14 and 15, the drag cup is angularly displaced in a direction causing the vane 20 to allow light from the source 22 to impinge upon the photocell 24. The photocell 24 is thus activated, controlling the circuit 25 to energize the relay 27, causing the circuit to the decrease winding of the pitch changing motor to be completed, and so energizing the motor to decrease the pitch of the propeller and thereby causing an increase in R. P. M. of the aircraft engine, which speed increase is translated by the speed sensor S into a corrective change of force upon the drag cup 12. If the relay 27 were to remain energized until the propeller pitch had decreased sufficiently to result in a speed increase of such magnitude that the drag cup 12 and its associated light vane 20 were returned to centered position, it is obvious that severe "hunting" would result, due to the time lags resulting from the inertia of the engine. Accordingly, some means for approximating proportionate control, instead of employing the simple "on-off" control just described, must be provided. This is accomplished by the electromagnet 35.

Upon energization of the relay 27, current flows through the resistance 33, and the electromagnet 35 is thus energized. The magnetic attraction of the electromagnet 35 for the magnetic element 34 is sufficiently strong to cause the drag cup 12 to be moved to centered position, against the force of springs 14 and 15, thus causing the vane 20 to interrupt the flow of light to the photoelectric cell 24, and so deenergizing the relay 27 and the decrease winding of the pitch changing motor. The result of this much of the operation is to supply a short "pulse" of current to the decrease winding of the pitch changing motor.

The vane and cup assembly, biased by the springs 14 and 15, has a natural period determined by the moment of inertia of the vane and cup assembly and the stiffness of the springs. The assembly is so designed that the torque produced by the interrupter magnet 35 causes the vane to return relatively slowly to centered position. In actual practice, I have found that for optimum performance, the natural period of the vane and cup assembly should be in the range .5–1.5 seconds. The natural period of the vane and cup assembly of course determines the duration of the pulse of current applied to the pitch changing motor. If the natural period is substantially below .5 second, then the duration of the current pulse may be so short that the pitch motor cannot properly accelerate, the motor will be unable to attain sufficient speed, and severe arcing of the relay contacts will result. If the natural period is too long, the corrective pulse of current applied to the pitch motor will be of such long duration that an overshoot will occur, which will result in oscillation or hunting of the entire system.

When the relay 27 opens as a result of centering of the drag cup and light vane by the action of the electromagnet 35, the electromagnet 35 is deenergized, since current no longer flows through resistance 33. With the electromagnet 35 deenergized, the drag cup 12 and its vane 20 are free to return to whatever angular position is determined by the existing resultant of the forces applied to the drag cup by the springs 14 and 15 and the speed sensor S. Therefore, if the engine speed, as it affects the speed sensor, is still insufficient to counterbalance the biasing force of the springs, the position assumed by the light vane 20 will still be such as to allow light from the source 22 to fall upon the photoelectric cell 24, and another "pulse" of current will be supplied to the decrease winding of the pitch changing motor in the same manner as just described. This action will continue until the propeller pitch has been changed sufficiently to result in an engine speed change of proper magnitude to cause the speed sensor to counterbalance the torque of the biasing springs. Upon the end of the last "pulse" of current to the decrease winding, as the electromagnet 35 becomes deenergized, the light vane 20 will remain in a position such as to prevent light from the source from falling upon either photoelectric cell.

It is obvious that, if the initial situation is such that the effect of the speed sensor upon the drag cup is greater than the biasing effect of the springs, operation of the device will be the same as just described, except that photoelectric cell 23 will be activated, and relay 26 will serve to energize the increase winding of the pitch changing motor.

In the foregoing explanation it has been assumed that the initial difference between the forces exerted upon the drag cup by the speed sensor and the biasing springs is sufficiently small that when the electromagnet 35 is energized upon actuation of one of the relays 26 and 27, the power of the electromagnet will be sufficient to cause the drag cup to be centered. But, the initial resultant force upon the drag cup may obviously be so great that the drag cup will be rotated sufficiently to effectively remove the magnetic element 34 from the field of the electromagnet 35. When this is true, the electromagnet will initially be unable to return the drag cup to centered position, even though the electromagnet is of course energized as soon as one of the relays 26 and 27 closes. But, as the propeller pitch is changed, resulting in an engine speed change translated into a change of force on the drag cup by the speed sensor S, the drag cup will gradually move toward centered position, and the magnetic element 34 therefore is gradually moved back into the field of the electromagnet 35. Therefore, as the engine speed error, as represented by the difference in effects of the springs 14 and 15 and the speed sensor S, approaches zero, the electromagnet 35 will again come into effective operation. The deflection required to remove the magnetic element 34 from the field of the electromagnet 35 can obviously be predetermined by proper design of the electromagnet.

The operation of the electromagnet 35 in periodically interrupting the controlling action to obtain an approximately proportional control, as distinct from an "on-off" control, will also be clear from Fig. 2, which shows a curve obtained by plotting the average speed of the pitch motor against engine speed error. It will be clear that, while the control operation is cyclically interrupted by action of the electromagnet 35, the pitch changing motor M will be repeatedly energized and deenergized, and the number of revolutions turned by the motor over a given period of time will depend upon the ratio between the time the vane 20 is centered to the time the vane is displaced sufficiently to allow activation of one of the photoelectric cells plus the inherent time lag of the device. This ratio in turn depends upon the magnitude of the speed error. Thus, as shown by the curve of Fig. 2, the average speed of the pitch changing motor is low when the speed error is small, and increases as the speed error increases. Obviously, for some given speed error of relatively large value, depending upon the design of electromagnet 35, the initial deflection of the vane 20 will be sufficiently great to prevent the electromagnet 35 from returning the vane to its normal position. For speed errors above this value, the pitch changing motor is operated continuously until the speed error is reduced by the governor to a value sufficiently small that the magnetic element 34 again comes within the effective field of the electromagnet 35. As the speed error is further reduced, the operation of the electromagnet 35, cyclically returning the vane 20 to centered position, progressively reduces the average speed of the pitch changing motor and prevents the device from over-controlling.

It will be noted that the restoring force applied to the drag cup 12 by the electromagnet 35 is a function of the speed error. The larger the speed error, the greater is the deflection of the drag cup, and the greater the distance between the electromagnet 35 and the magnetic element 34 at the start of the control action. Thus, since the force of attraction of the electromagnet for the magnetic element decreases with distance, the restoring force is inversely proportional to speed error.

While the preferred embodiment of the invention provides for a restoring force which is a function of the speed error, it should be understood that this need not be so for satisfactory operation. If desired, the electromagnet 35 can be so designed as to restore the drag cup 12 from any deflected position.

Fig. 3 shows in detail a preferred electrical circuit for use in the device described with reference to Fig. 1. Here, the photoelectric cells 23 and 24, selectively activated by light from lamp 22 by reason of the action of light vane 20, control the grids of a double beam amplifier tube 40, the plates of the tube being connected to the actuating coils of the increase relay 26 and the decrease relay 27, respectively, and thence to conductor 41. The conductor 41 is connected through a multiple connector 42 to the manual switch 39 on the aircraft instrument panel, by which switch the circuit is connected to a suitable source of current.

The photoelectric cells 23 and 24 are connected to conductor 41 and, through suitable resistances 43 and 44, respectively, to grounded conductor 45. The lamp 22 is connected between conductor 41 and ground.

The movable contact 46 of relay 26 is biased in any suitable manner to engage a stationary contact 47 when the relay is deenergized, and is brought into engagement with a stationary contact 48 when the relay is energized. The movable contact 49 of the relay 27 is biased to engage a stationary contact 50 when the relay is deenergized, and is brought into engagement with a stationary contact 50 when the relay is energized. The stationary contact 47 is connected by the conductor 51 to one terminal of the actuating winding 52 of a safety relay 53, the remaining terminal of winding 52 being connected to ground. By a conductor 54, the stationary contact 47 is also connected to the movable contact 49 of relay 27. The supply conductor 41 is connected by the conductor 55 to the movable contact 46 of the relay 26, and thence by a conductor 56 to the stationary contact 50 of the relay 27. The stationary contact 48 of the control relay 26 is connected by a conductor 57 through the normally open contacts of the safety relay 53 to the multiple connector 42 and thence to the actuating winding (not shown) of the power relay for the increase winding of the pitch changing motor. The stationary contact 51 is connected by a conductor 58 through the multiple connector 42 to the actuating winding (not shown) of the power relay for the decrease winding of the propeller pitch changing motor.

Bridged across the conductors 57 and 58 is the series combination of resistances 32 and 33, and the junction between these two resistances is connected to one terminal of the winding of the interrupter electromagnet 35, the remaining terminal of the winding being connected to ground.

When the photoelectric cell 23 is activated by light from the lamp 22, the cell becomes conductive and thus applies a potential to the corresponding grid of the tube 40, which thereupon becomes conductive as to the plate connected to the winding of relay 26. The relay 26 is thus energized, causing its movable contact 46 to engage the contact 48. A circuit is thus completed from the conductor 41, through the conductors 55 and 57 to the multiple connector 42, and thence to the power relay for the increase winding of the pitch changing motor. The relay 27 being deenergized, current flows through the conductor 56, the contacts 49 and 50, and the conductors 54, 51 to energize the winding 52, causing the safety relay 53 to complete the circuit through the conductor 57. Since the relays 26 and 53 are energized, the interrupter electromagnet 35 is energized by current flowing through the conductor 36 and the resistance 32, and as described with reference to Fig. 1, the interrupter magnet serves to cut off the flow of light to the photoelectric cell 23. Upon deactivation of the cell 23, the tube 40 becomes non-conductive as to the plate connected to the relay 26, and this relay is accordingly deenergized, the contact 46 thereof returning to engagement with stationary contact 47. Supply of current to the power relay of the increase winding of the pitch changing motor is thus interrupted. Simultaneously with deenergization of the relay 26, the interrupter electromagnet 35 is deenergized, since current no longer flows in the resistance 32.

When the photoelectric cell 24 is activated by light from the lamp 22, the tube 40 is made conductive as to the plate connected to the winding of the relay 27. This relay being thus energized, the movable contact 49 is brought into engagement with the contact 51, completing a circuit from the conductor 41 through the conductor 55, the contacts 46 and 47 of relay 26, the contacts 49 and 51 of relay 27, the conductor 58 and, through the multiple connector 42, to the power relay for the decrease winding of the propeller pitch changing motor. Upon energization of the relay 27, current flows to the interrupter magnet 35, the vane 20 is therefore moved to cause the photoelectric cell 24 to be deactivated, and the relay 27 is thus deenergized.

It is clear that, so long as a sufficient speed error of either sense exists, the cycle of operation of the circuit shown in Fig. 3 will be repeated, as previously explained in the description of Fig. 1.

When there exists an engine speed error such as to cause the speed sensor to allow light from the source 22 to activate the photoelectric cell 23 and thus cause the relay 26 to be energized, the increase winding of the pitch changing motor will be energized, providing that the contacts of relay 27 are in deenergized position so that safety relay 53 in energized to complete the conductor 57. When there is an engine speed error such as to cause the speed sensor to allow light from the source 22 to activate the photoelectric cell 24 and thus cause the relay 27 to be energized, the decrease winding of the pitch changing motor will be energized, providing that the contacts of the relay 26 are in deenergized position so that current may flow from the conductor 55 to the conductor 58. Should there occur in the circuit of Fig. 3 a short circuit such as to cause the relay 27 to be continuously energized so that current flows continuously in the conductor 58, the decrease winding of the pitch changing motor is then energized, the propeller pitch is therefore decreased, and the engine speed falls off. Accordingly, there is a speed error such as to cause the speed sensor to allow light to fall upon the photoelectric cell 23, and the relay 26 is energized. Both the relay 26 and the relay 27 now being energized, no current can flow to the winding 52 of the safety relay 53, and the conductor 57 is accordingly interrupted to prevent energization of the increase winding of the pitch changing motor. And, since the relay 26 is energized, current cannot now flow from the conductor 55 to the conductor 58. The effect of the short circuit thus is to cause no further energization of either winding of the pitch changing motor, and the propeller pitch remains substantially as it was at the time the short circuit occurred. The operator can then operate the selector switch 39, Fig. 1, to deactivate the automatic control and change over to manual control of the power relays of the pitch changing motor, in a manner well known before the present invention.

Should a short circuit occur which causes the relay 26 to be continuously energized, the increase winding of the pitch changing motor is then energized, the propeller pitch is increased, the engine speed therefore increases, and a speed error results which causes the photoelectric cell 24 to be activated, the relay 27 thus being energized. Both the relay 26 and the relay 27 now being energized, the safety relay 53 is deenergized, breaking the conductor 57 and so causing the increase winding of the pitch changing motor to be deenergized. And, since both the relay 26 and the relay 27 are energized, current cannot flow from conductor 55 to the conductor 58, and the decrease winding of the pitch changing motor is deenergized. Again, the pitch of the propeller remains substantially as it was when the short circuit occurred, and the selector switch 39, Fig. 1, can be actuated to deactivate the automatic control and change over to manual control.

It will be noted from Fig. 3 that, when a short circuit or other electrical failure exists such as to cause both the relay 26 and the relay 27 to be energized, there is no current supplied to the interrupter magnet 35, which thus remains deenergized even though a speed error has been sensed.

Figs. 4 and 5 illustrate a preferred mechanical organization of the speed sensor, drag cup and light vane, manually adjustable biasing means, interrupter magnet, light source and photoelectric cells. The speed sensor S, driven by the flexible shaft 10, is carried by a panel 60 to which are secured spaced, upright supports 61 and 62. Spaced above the panel 60 by the supports 61 and 62 is a lower bearing plate 63. Located above the plate 63 is an upper bearing plate 64, supported by suitable uprights, one of which is shown at 65, Fig. 5. A pair of horizontal arms 66 and 67, mounted on the uprights 61 and 62, respectively, support a horizontal plate 68, which plate has a central opening 69. The lamp 22 is carried by a suitable conventional socket 70 mounted on the panel 60 in a position such that the lamp is located below the opening 69 of the plate 68. The photoelectric cells 23 and 24 are located one at each side of the opening 69, the cells being mounted in any suitable manner on the plate 68, the details of the mounting depending upon the nature of the cells employed. For simplicity, only photoelectric cell 24 has been illustrated, and it will be understood that the cell 23 is similarly mounted diametrically across the opening 69 from the cell 24.

The vertical shaft 13 of the drag cup 12 extends upwardly through the lower bearing plate 63 and, above the plate 63, is secured to the inner ends of the spiral springs 14 and 15, as seen in Fig. 4 and more clearly shown in Fig. 6. The drag cup 12 is thus supported immediately above the speed sensor S, and the light vane 20 carried by the drag cup extends horizontally under the plate 68, so as to be interposed between the lamp 22 and the aperture 69. As seen in Fig. 4, a vertical light partition 71 is mounted on the upper surface of the plate 68 and extends vertically upward between the photoelectric cells 23 and 24. Thus, if the vane 20 is displaced laterally sufficiently to allow light from lamp 22 to fall upon the cell 24, the partition 71 prevents any of the light from reaching the cell 23. In a like manner, the partition 71 serves to maintain the cell 24 deactivated when the light vane is displaced in the opposite direction to activate cell 23. The vane 20 is provided with side extensions 72 and 73 to engage a central stop 74, carried by the plate 68.

The interrupter magnet 35 is supported by a bracket 75 carried by the lower bearing plate 63 and extending horizontally above the "centered" position of magnetic element 34.

Fig. 5 illustrates in detail one manner in which the drag cup shaft and speed selector gear may be mounted. Here, it is seen that the lower end of the shaft 13 rests in a suitable anti-friction bearing 81 in the rotating magnet of the speed sensor, while the upper support for the shaft is a bearing 82 in the plate 63. The speed selector gear 16 lies immediately adjacent the upper surface of the bearing plate 63 and, as shown in Fig. 6, is provided with a central opening materially larger than the drag cup shaft structure, so that the speed selector gear may be supported for free rotation by an annular bushing 76, the bushing 76 being spaced from the drag cup shaft structure. Thus, both the speed selector gear 16 and the drag cup shaft 13 are supported for free rotation by the bearing plate 63, but are free to rotate relative to each other, except for the restraining springs 14 and 15.

The spiral restraining springs 14 are located in closely spaced parallel planes just above the speed selector gear 16. The inner end of each spiral spring is connected to a hub carried by the drag cup shaft, the points of connection of the two springs being diametrically opposed as shown in Fig. 6. The outer end of spring 14 is connected to a post 77 extending upwardly from gear 16, and the outer end of the spring 15 is connected to a similar post 78. As seen in Fig. 6, the posts 77 and 78 are diametrically opposed across the gear 16, and a line drawn between them would intersect at right angles a line between the points of connection of the inner ends of the two springs 14 and 15. It will thus be seen that the restraining forces applied to the shaft 13 by the springs 14 and 15 depend upon the angular position of the speed selector gear 63. Further, the restraining forces applied by the two springs are additive, but are applied to the shaft at diametrically opposed points. The restraining action of the adjustable spring means therefore has no tendency to displace the shaft 13 sidewise. This is a feature important to satisfactory operation of the control device as a whole, since it greatly reduces friction in the shaft bearing, and therefore reduces any tendency of the system toward "hunting."

Adjusting pinion 17 is carried by a shaft 79 journalled in the bearing plates 63 and 64 and provided at its upper end with a spline connection 80 adapted to receive the end of flexible shaft 18, Fig. 1, so that manual rotation of the shaft 18 results in rotation of the gear 16. Assuming that the speed sensor S applied no force to the drag cup 12, then clockwise rotation of the shaft 18 in response to manipulation of the manual speed selector knob 19, Fig. 1, would, through the pinion 17, the gear 16 and the spiral hair springs 14 and 15, produce a clockwise rotation of the drag cup shaft 13. With the speed sensor applying a counterclockwise torque to the drag cup, it is then clear that the position assumed by the drag cup is determined by the resultant of the forces applied to the drag cup by the speed sensor and the two restraining springs. The device thus functions to compare the engine speed, as detected by the speed sensor, with the setting of the manually adjusted speed selecting means comprising shaft 18, gears 17 and 16, and springs 14 and 15, and to translate any existing speed error into selective activation of the photoelectric cells 23 and 24, the particular cell activated depending upon the sense or direction of the speed error.

Fig. 7 shows in detail the combination of the drag cup 12, the light vane 20, the counterbalance 21 and the magnetic element 34. The counterbalance 21 of course serves only to offset the unbalance in the rotating system caused by the presence of vane 20, and its function could be accomplished entirely by making the magnetic element 34 of proper weight. But, in order to obtain a sharper action of the interrupter magnet, it is desirable that the magnetic element 34 have a small dimension in the direction of rotation of the drag cup. Accordingly, the element 34 is made rectangular in shape, positioned with its longer dimention radial to the drag cup, and is kept small relative to the total mass of the counterbalance.

I claim:

1. In a speed responsive control mechanism, a pair of electro-responsive control devices; a pair of light-responsive devices; light means for activating said light-responsive devices; electrical means for energizing said control devices selectively in response to activation of said light-responsive devices; an eddy-current type speed sensor including a rotatable drag cup and means biasing said drag cup against rotation, said speed sensor operating to rotate said drag cup selectively in either direction from its initial position in response to speed changes of the device controlled; a light vane arranged to be moved by rotation of said drag cup, said light vane being positioned to control the flow of light between said light means and said light-responsive devices; a magnetic element carried by said drag cup at a point radially removed from the center thereof; an electromagnet arranged adjacent the initial position of said magnetic element, and means for energizing said electromagnet to attract said magnetic element only when one of said electro-responsive control devices is energized.

2. In an automatic constant speed governor for an engine driving a controllable pitch propeller, an electrical propeller pitch changing motor having a pitch increase winding and a pitch decrease winding; a first circuit for energizing said increase winding; a first normally deenergized control relay, said relay being arranged to complete said first circuit only when said relay is energized; a second circuit for energizing said decrease winding; a second normally deenergized control relay, said relay being arranged to complete said second circuit only when said second relay is energized; a movable control element; engine speed responsive means for applying a positioning force to said control element, the magnitude of said positioning force being proportional to true engine speed; manually adjustable means for applying a biasing force to said control element in opposition to said positioning force and proportional to desired engine speed; electrical means responsive to the position of said control element for energizing only said first relay when said positioning force predominates and for energizing only said second relay when said biasing force predominates, and electrical safety means for preventing completion of either of said circuits when both of said control relays are simultaneously energized, said safety means including a safety relay having normally open contacts in one of said circuits, and energizing means for said safety relay including contact means opened whenever the control relay for the other of said circuits is energized.

3. In an automatic constant speed governor for an engine driving a controllable pitch propeller, an electrical propeller pitch changing motor having a pitch increase winding and a pitch decrease winding; a first power circuit for energizing said increase winding; a first normally deenergized power relay arranged to complete said first power circuit only when said first power relay is energized; a first normally deenergized control relay; a first control circuit completed only upon energization of said first control relay for energizing said first power relay; a second power circuit for energizing said decrease winding; a second normally deenergized power relay arranged to complete said second power circuit only when said second power relay is energized; a second normally deenergized control relay; a second control circuit completed only upon energization of said second control relay for energizing said second power relay; means for energizing said first control relay in response to excessive engine speed and for energizing said second relay in response to insufficient engine speed; a safety relay having normally open contacts in said first control circuit and being arranged to complete said control circuit only when said safety relay is energized, and means energizing said safety relay only when said second control relay is deenergized.

4. In a speed responsive control system, the combination of a pair of control relays, a pair of photoelectric cells, light means, electrical means for selectively actuating said relays in response to activation of said photoelectric cells by light from said light means, a rotatable control element, a light vane carried by said control element and interposed between said light means and said cells, rotation of said control element in one direction moving said vane to allow light to impinge upon one of said cells and rotation of said control element in the opposite direction moving said vane to allow light to impinge upon the other of said cells, means responsive to the speed of the controlled device for applying to said control element a deflecting torque proportional to the speed of the controlled device, biasing means for applying to said control element a biasing torque in opposition to said deflecting torque, and restoring means actuated only upon actuation of one of said control relays for restoring said control element to centered position, in which said light vane prevents passage of light from said light means to either of said cells, when the deviation of said control element from centered position is less than a predetermined amount.

5. In a speed responsive control system, the combination of a pair of control relays, a pair of photoelectric cells, light means, electrical means for selectively actuating said relays in response to activation of said photoelectric cells by light from said light means, a rotatable control element, a light vane carried by said control element and interposed between said light means and said cells, rotation of said control element in one direction moving said vane to allow light to impinge upon one of said cells and rotation of said control element in the opposite direction moving said vane to allow light to impinge upon the other of said cells, deflecting means responsive to the speed of the controlled device for applying to said control element a deflecting torque proportional to the speed of the controlled device, biasing means for applying to said control element a biasing torque in opposition to said deflecting torque, electromagnetic means for applying a restoring force to said control element, and an electric circuit for energizing said electromagnetic means only when one of said relays is actuated.

6. In a speed responsive control system, the combination of a pair of electro-responsive control devices, a control element, a shaft mounting said control element for rotary movement in a single plane, deflecting means operated by the device controlled for applying to said control element a deflecting torque proportional to the speed of the device controlled, a bias adjusting member mounted for free rotation about said shaft in a plane parallel to the plane of movement of said control element, a spiral hairspring connected at its center to said shaft and at its outer end to said bias adjusting member, manually operable means for adjusting the rotary position of said bias adjusting member to apply a biasing torque to said control element in opposition to said deflecting torque, an actuating circuit controlled by said control element and operatively connected to said control devices to energize one of said control devices when said deflecting torque predominates and the other of said control devices when said biasing torque predominates, a magnetic element carried by said control element at a point radially removed from the center thereof, a single electromagnet, means mounting said electromagnet entirely outside of the path of movement of said control element and substantially aligned with the position occupied by said magnetic element when said biasing torque and said deflecting torque are equal, and an electrical circuit arranged to energize said electromagnet to attract said magnetic element only whenever either of said control devices is energized.

7. In a speed responsive control system, the combination of a pair of electro-responsive control devices, an eddy-current speed sensor including a rotatable drag cup and means driven by the controlled device for applying to said drag cup a deflecting torque proportional to the speed of the controlled device, biasing means operatively connected to said drag cup to apply thereto a biasing torque in opposition to said deflecting torque, means responsive to the position of said drag cup for energizing one of said control devices when said deflecting torque predominates and the other of said control devices when said biasing torque predominates, a magnetic element carried by said drag cup at a point radially removed from the center thereof, a single electromagnet, means mounting said electromagnet entirely outside the path of movement of said drag cup and substantially aligned with the position occupied by said magnetic element when said torques are equal so that rotation of said drag cup resulting from predominance of either of said torques tends to remove said magnetic element from the field of said electromagnet and the attraction of said electromagnet for said magnetic element is thus inversely proportional to the difference between said torques, and circuit means connecting the winding of said electromagnet in parallel with said control devices to energize said electromagnet whenever either of said control devices is energized.

8. In an automatic constant speed governor system for an engine driving a controllable pitch propeller, the combination of an electrical pitch changing motor having a pitch increase winding and a pitch decrease winding; power circuits connected to said windings; a first power relay having normally open contacts in the power circuit for said increase winding; a second power relay having normally open contacts in the power circuit for said decrease winding; a first control relay having normally open and normally closed contacts; a second control relay having normally open and normally closed contacts; an energizing circuit including the winding of said second power relay, the normally open contacts of said second control relay and the normally closed contacts of said first control relay in series; a safety relay having a set of normally open contacts; a second energizing circuit including the winding of said first power relay, the normally open contacts of said safety relay, and the normally open contacts of said first control relay in series; a third energizing circuit including the winding of said safety relay and the normally closed contacts of said second control relay in series, and means for energizing said first control relay in response to excessive engine speed and said second control relay in response to insufficient engine speed.

9. In a speed responsive control system, the combination of a pair of electro-responsive control devices, a control element, means mounting said control element for rotary movement in a single plane, deflecting means operated by the device controlled for applying to said control element a deflecting torque proportional to the speed of the device controlled, biasing means operably associated with said control element for applying thereto a biasing torque in opposition to said deflecting torque, an actuating circuit controlled by said control element and operatively connected to said control devices to energize one of said devices when said deflecting torque predominates and the other of said devices when said biasing torque predominates, a magnetic element carried by said control element at a point radially removed from the center thereof, a single electromagnet, means mounting said electromagnet entirely outside of the path of movement of said control element and with its axis substantially at right angles to the plane of movement of said control element and aligned substantially with the position occupied by said magnetic element when said biasing and deflecting torques are equal, and an electrical circuit arranged to energize said electromagnet to attract said magnetic element whenever either of said control devices is energized.

10. In a speed responsive control system, the combination of a pair of control relays, a control element, means mounting said control element for rotary movement in a single plane, deflecting means operated by the device controlled for applying to said control element a deflecting torque proportional to the speed of the device controlled, biasing means operably associated with said control element for applying thereto a biasing torque in opposition to said deflecting torque, an actuating circuit controlled by said control element and operatively connected to said relays to actuate one of said relays when said deflecting torque predominates and the other of said relays when said biasing torque predominates, a pair of equal resistances connected in series between the actuating coils of said relays, a magnetic element carried by said control element at a point radially removed from the center of rotation thereof, a single electromagnet, means mounting said electromagnet entirely outside of the path of movement of said control element and substantially aligned with the position occupied by said magnetic element when said deflecting and biasing torques are equal, and an actuating circuit for said electromagnet connecting said electromagnet in parallel with said relays through said resistances, whereby said electromagnet is energized to attract said magnetic element whenever either of said relays is actuated.

11. In an automatic constant speed governor for an engine driving a controllable pitch propeller, the combination of an electrical pitch changing motor having a pitch increase and a pitch decrease winding; a first circuit for energizing said increase winding; a first control relay having normally open contacts in said first circuit and arranged to complete said circuit only when said relay is energized; a second circuit for energizing said decrease winding; a second control relay having normally open contacts in said second circuit and arranged to complete said second circuit only when said relay is energized; a pair of photoelectric cells; light means; electrical means for selectively actuating said control relays in response to activation of said cells by light from said light means; a rotatable control element; a light vane carried by said control element and interposed between said light means and said cells, rotation of said control element in one direction moving said vane to allow light to impinge upon one of said cells and rotation of said control element in the opposite direction moving said vane to allow light to impinge upon the other of said cells; engine speed responsive means for applying to said control element a deflecting torque responsive to true engine speed; manually adjustable means operatively connected to said control element to apply thereto a biasing torque in opposition to said deflecting torque and proportional to desired engine speed; electromagnetic restoring means actuated only upon actuation of either of said control relays for restoring said control element to centered position, in which said light vane prevents passage of light from said light means to either of said cells, when the deviation of said control element from centered position is less than a predetermined amount; and electrical safety means for preventing completion of either of said circuits when both of said control relays are simultaneously actuated.

ROBERT HASKINS.

References Cited in the file of this patent

UNITED STATES PATENTS

| Number | Name | Date |
|---|---|---|
| 1,216,272 | Berry | Feb. 20, 1917 |
| 1,378,971 | Moore | May 24, 1921 |
| 1,713,860 | Zubaty et al. | May 21, 1929 |
| 1,760,857 | Berg | May 27, 1930 |
| 1,939,436 | Conn | Dec. 12, 1933 |
| 1,973,468 | Denis | Sept. 11, 1934 |
| 2,073,152 | Helgeby | Mar. 9, 1937 |
| 2,216,472 | Harrison | Oct. 1, 1940 |
| 2,224,954 | Eisele | Dec. 17, 1940 |
| 2,263,264 | Duwe | Nov. 18, 1941 |
| 2,334,967 | Thomas et al. | Nov. 23, 1943 |
| 2,357,055 | Mydans | Aug. 29, 1944 |
| 2,365,601 | Sipman | Dec. 19, 1944 |
| 2,440,083 | Gley | Apr. 20, 1948 |
| 2,479,309 | Cave | Aug. 16, 1949 |
| 2,567,567 | Kohlhagen | Sept. 11, 1951 |